United States Patent [19]
Conklin

[11] 3,791,537
[45] Feb. 12, 1974

[54] APPARATUS FOR ORIENTATING AND STACKING CUP-LIKE ARTICLES

[76] Inventor: Clayton E. Conklin, 4203 Hookheath, El Paso, Tex. 79922

[22] Filed: Oct. 16, 1972

[21] Appl. No.: 297,680

[52] U.S. Cl............ 214/6.5, 198/33 AA, 198/53 R, 221/164, 221/167, 214/6 H, 214/8 R
[51] Int. Cl............................................. B65g 57/20
[58] Field of Search.. 214/6 D, 6 FA, 6 H, 6.5, 8 R; 198/33 AA, 53, 54, 55, 62, 52; 221/163, 164, 165, 167, 168, 175; 193/43 R

[56] References Cited
UNITED STATES PATENTS

| | | |
|---|---|---|
| 2,214,814 | 9/1940 | Hambleton ..................... 221/175 X |
| 3,054,170 | 9/1962 | Benichasa et al............. 193/43 R X |
| 3,352,455 | 11/1967 | Wysocki et al. ................ 198/33 AA |

Primary Examiner—Robert J. Spar
Attorney, Agent, or Firm—Allen D. Brufsky

[57] ABSTRACT

Apparatus in which cup-like articles are received within a hopper in random orientation, agitated, and picked up singularly from the hopper by a rotating disc provided with means to orient and transport them to a turntable where they are guided and dropped into vertical stacks in nested relation. An indexing mechanism responsive to the number of articles stacked will cause the turntable to rotate 90° when a predetermined number of articles are present in the stack so that an identical stack of articles can be started.

19 Claims, 10 Drawing Figures

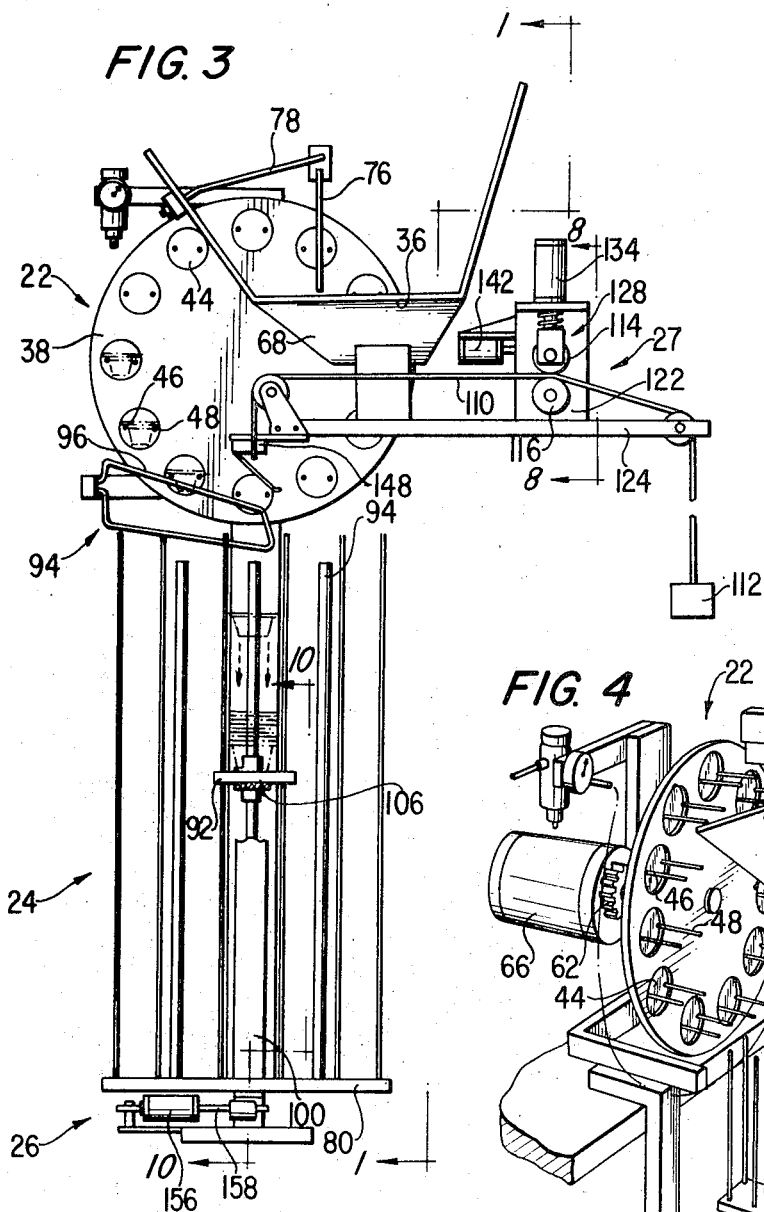
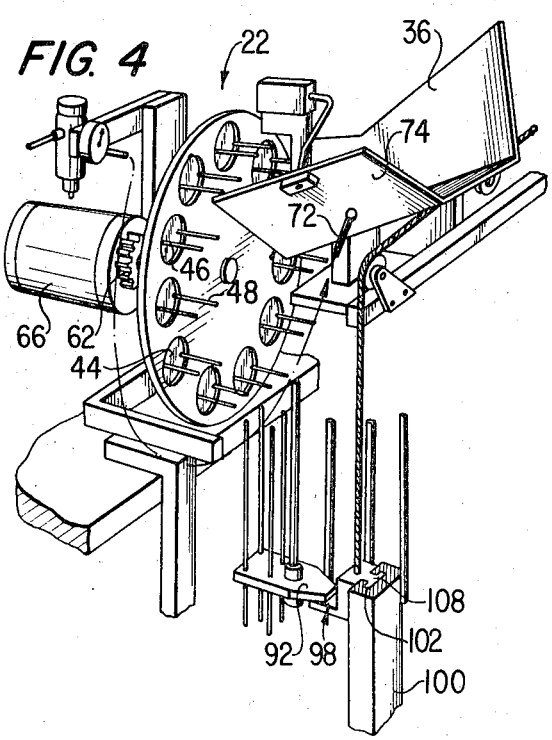

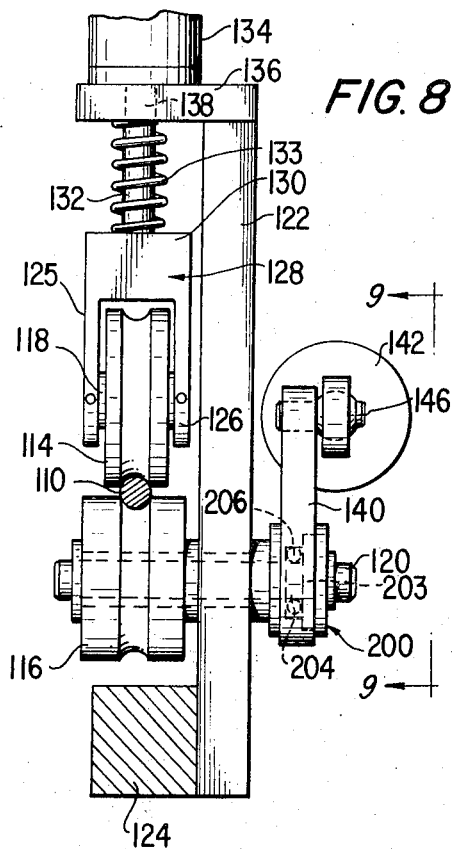
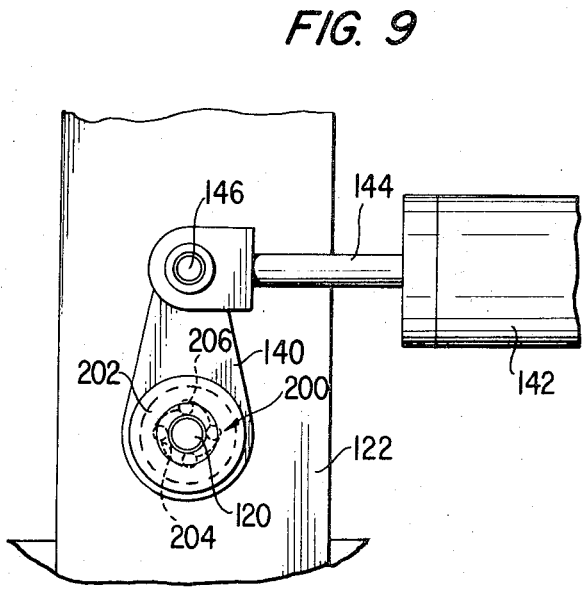
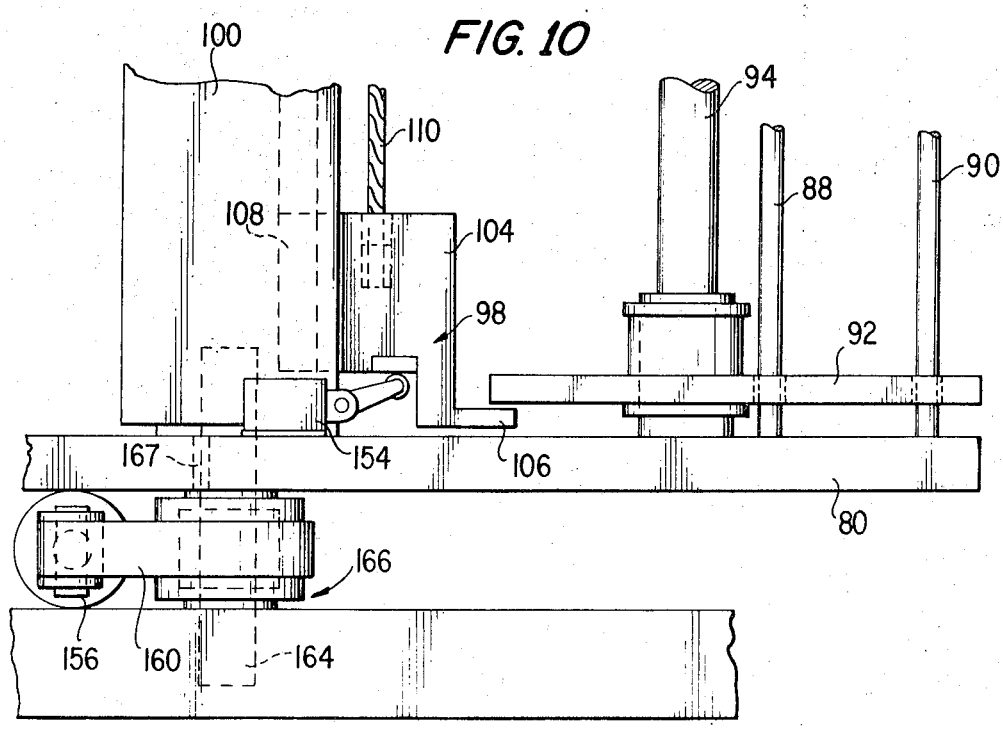

APPARATUS FOR ORIENTATING AND STACKING CUP-LIKE ARTICLES

BACKGROUND AND SUMMARY OF THE INVENTION

This invention relates to an apparatus for receiving a plurality of cup-like articles in random orientation and automatically stacking them in nested relation in predetermined amounts.

The apparatus of the present invention accomplishes the orientation and stacking of molded, cup-like articles provided with an annular rim and a depending, frusto-conical body portion. The articles are deposited in a hopper directly from an injection molding machine in random orientation as they are formed. They are continuously agitated in the hopper and picked up singularly from the hopper by a rotating disc having spaced pairs of parallel pins about its circumference which are adapted to grasp an article beneath its rim portion. The pins are mounted on individually rotatable counterweighted discs so that the pins are always maintained in a horizontal plane, thereby orienting the articles so that the axis of revolution of their frusto-conical body portions is substantially vertical. The articles are transported by the rotatable disc to a turntable where they are guided and dropped into vertical stacks in nested relation.

An indexing mechanism responsive to the number of articles in any one stack will cause the turntable to rotate 90° when a predetermined number of articles are present in the stack so that another stack of identical articles can be started. The indexing mechanism includes a microswitch which senses the passing of each article being stacked. The microswitch activates a unidirectional bearing which lowers an article support platform against the bias of a weight an exact increment to enable the article to seat and nest within the preceding article in the stack. When a predetermined number of articles have been nested, the support platform strikes a second microswitch to activate rotation of the turntable and the positioning of an empty support platform adjacent the transportation and orientation disc.

Other objects and advantages of the invention will become readily apparent from the following specification and claims, and from the accompanying drawings wherein:

BRIEF DESCRIPTION OF THE DRAWINGS

FIG. 3 is a front view in elevation of the apparatus illustrated in FIG. 1;

FIG. 4 is a fragmentary perspective view of the top portion of the apparatus shown in FIG. 1 and illustrating the front of the apparatus;

FIG. 8 is an enlarged, cross-sectional view taken substantially along the plane indicated by line 8 — 8 of FIG. 3;

FIG. 9 is a side view in elevation of the portion of the apparatus illustrated in FIG. 8 as seen from the plane indicated by line 9 — 9 of FIG. 8; and FIG. 10 is an enlarged, cross-sectional view taken substantially along the plane indicated by line 10 — 10 of FIG. 3.

DESCRIPTION OF THE PREFERRED EMBODIMENT

Figure 1:
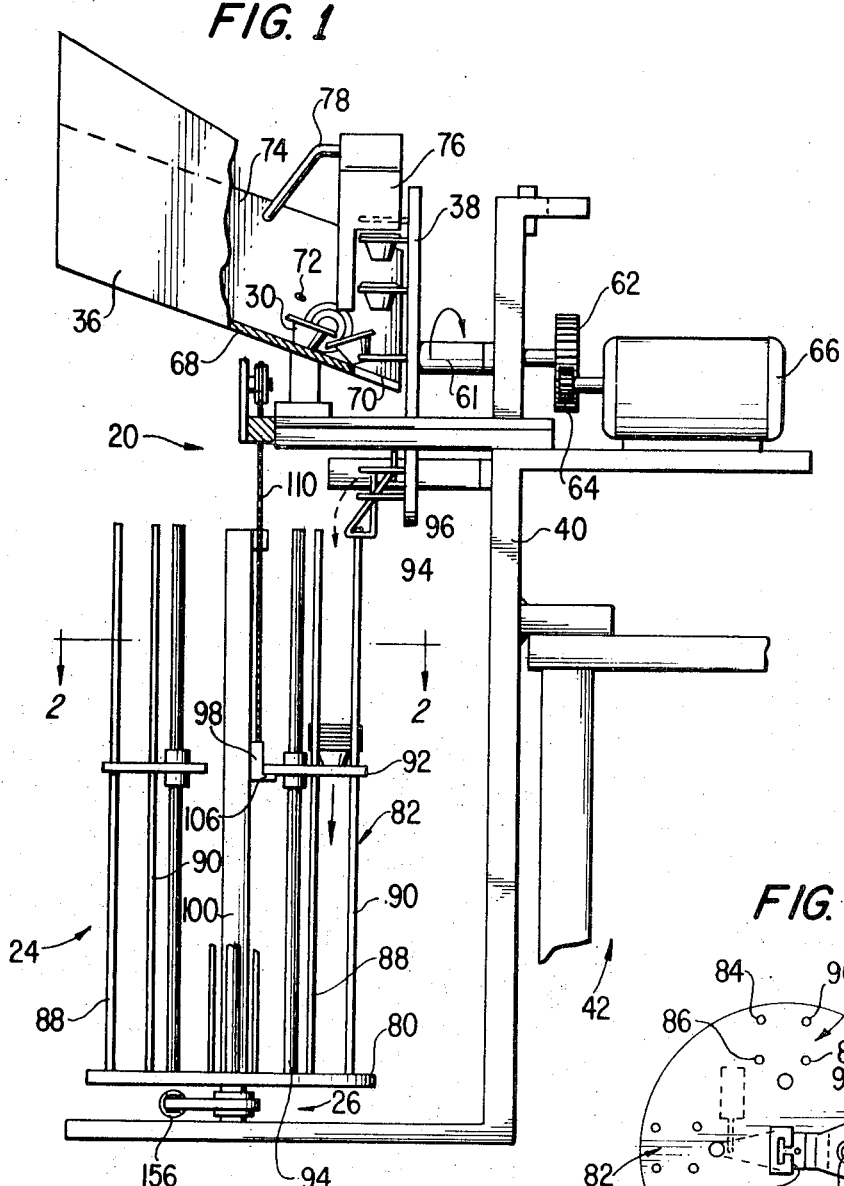
FIG. 1 is a side view in elevation of the apparatus of the present invention, with certain portions deleted and shown in cross-section (as seen along the plane indicated by line 1 — 1 of FIG. 3) for purposes of illustrating the operation of the apparatus.
Figure 2:
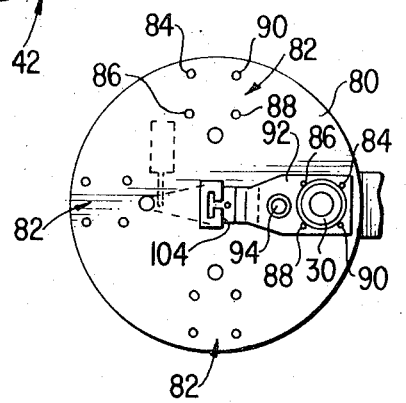
FIG. 2 is a cross-sectional view taken substantially along the plane indicated by line 2 — 2 of FIG. 1.
Figure 5:
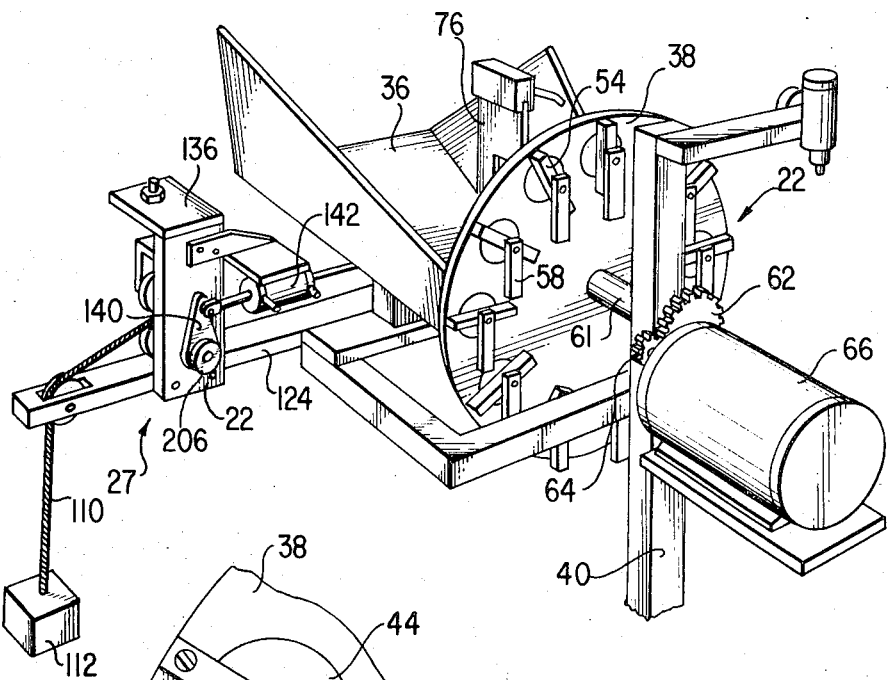
FIG. 5 is a view similar to FIG. 4, but taken from the opposite direction illustrating the rear of the apparatus.

Referring now to the drawings in detail, wherein like numerals indicate like elements throughout the several views, the apparatus of the present invention is generally indicated by the numeral 20.

Apparatus 20 is designed to receive a plurality of cup-like containers 30 having an annular rim 32 and a frusto-conical housing 34 directly from an injection molding device (not shown) as they are formed. Cups 30 are generally of the type sold by fast food chains to house ketchup, mustard, milk, etc., and can vary in depth. The cups 30 are received in random orientation and alignment in a hopper 36.

Apparatus 20 includes a cup orientation and alignment mechanism 22 for positioning the cups in vertical alignment (illustrated in detail in FIGS. 4 - 7), a cup stacking mechanism 24 for stacking the vertically aligned cups in nested relation (illustrated in detail in FIGS. 1 and 3), and indexing mechanisms 26, 27 (illustrated in detail in FIGS. 3, 5, and 8 - 10) for rotating the stacking mechanism to present another stacking position for receipt of the oriented cups in nested relation after a predetermined number are stacked, and to lower each stack of cups an exact increment to receive each single cup in stacked relation regardless of its dimension until the predetermined number of each stack is reached, respectively.

ORIENTATION MECHANISM

Orientation mechanism 22 includes a substantially vertical disc 38 rotatably mounted on a stationary standard 40 constituting a portion of the frame 42 of apparatus 20. Mounted for independent rotation at equally spaced locations about the circumference of disc 38, in openings 39, are a plurality of smaller discs 44.

Each of the small discs 44 has a pair of parallel pins 46, 48 extending outwardly from the plane of disc 38. The pins 46, 48 on each small disc 44 are always maintained in a horizontal plane, perpendicular to the plane surface of disc 38.

Figure 6:
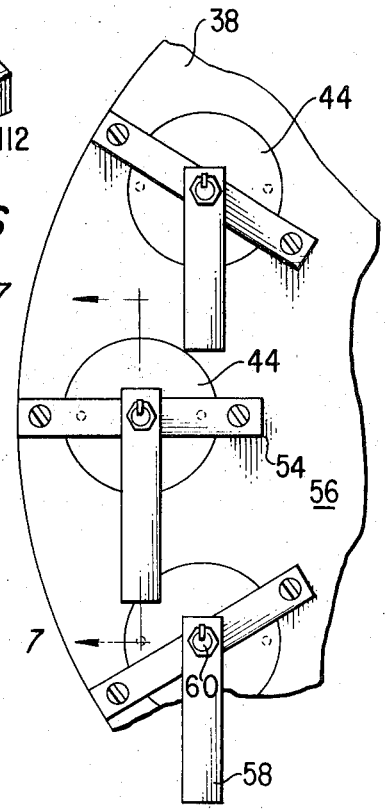
FIG. 6 is an enlarged fragmentary view in elevation of a portion of the apparatus shown in FIG. 5.
Figure 7:
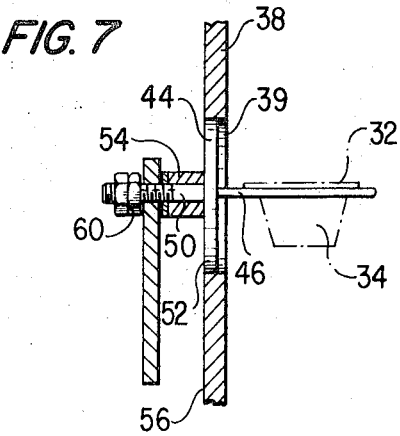
FIG. 7 is a cross-sectional view taken substantially along the plane indicated by line 7 — 7 of FIG. 6.

As shown in greater detail in FIGS. 6 and 7, each small disc 44 has a threaded shaft 50 fixed to its rear surface 52. Shaft 50 extends rotatably through a mounting bar 54 securely fastened as its ends to rear surface 56 of disc 44, along a radius of disc 44. A counterweight 58 is hung and held by nuts 60 on the end of each threaded shaft 50.

Counterweight 58 will hang substantially vertical on the end shaft 50 as disc 38 rotates and will maintain each pair of pins 46, 48 on smaller disc 44 in a substantially horizontal plane as disc 38 rotates. As disc 38 rotates, counterweights 58 will cause relative rotation between mounting bars 54 fixed along radii of disc 38 and each of the freely rotatable discs 44.

Disc 38 is mounted on a shaft 61 which is rotatably driven through speed reduction gears 62, 64 by an electric motor 66 carried on frame 42. The disc 38 is mounted on frame 42 adjacent hopper 36 so that the horizontal pins 46, 48 on each small disc 44 are adapted to enter the interior of hopper 36 during rotation of disc 38. In order to enable entrance of pins 46, 48 into the interior of hopper 36, the bottom surface 68 of hopper 36 includes a slot 70 positioned in the rotational path of travel of each pair of pins 46, 48 on smaller discs 44.

As cups 30 are expelled from an injection molding machine into hopper 36 they are agitated by an airjet expelled from a hose 72 positioned in a side wall 74 of hopper 36. The airject is also directed onto cups 30 so as to push the cups toward slot 70 and a pair of pins 46, 48 traversing the slot. A pair of pins 46, 48 will tend to seat beneath the annular rim 32 of a cup 30 (the distance between the pins being less than the diameter of the rim) and lift the cup 30 from the hopper 36 to transport it out of the hopper about the circumference of disc 38.

If a cup 30 is improperly seated or oriented at an angle relative to the horizontally maintained plane defined by a pair of pins 46, 48, it is knocked out of engagement with pins 46, 48 by a wiper blade 76 and will fall back into hopper 36.

Wiper blade 76 is made from flexible rubber and is mounted on sidewall 74 of hopper 36 by a bracket 78 just above the path of travel of each set of pins 46, 48 so that unless rim 32 of cup 30 is seated flush on the pins with the axis of revolution of frusto-conical housing 34 substantially perpendicular to the horizontal plane of the pins 46, 48, the blade 16 will make contact with the cup 30 and knock it back into hopper 36. Therefore, each pair of pins 46, 48 on a small disc 44 will pick up a cup 30 beneath its rim 32 and transport it in substantially vertical orientation at all times to stacking mechanism 24 for subsequent handling.

STACKING MECHANISM

Stacking mechanism 24 is adapted to receive cups 30 and stack them in nested relation in a plurality of stacks containing a predetermined number of cups.

In order to achieve this objective stacking mechanism 24 includes a turntable 80 rotatably mounted on frame 42. Four elevators 82, each formed in part by a square array of rods 84, 86, 88 and 90 extend upwardly from a plane surface of turntable 80. A cup support platform 92 is slidably mounted on each square array of rods 84, 86, 88 and 90, as well as an adjacent support standard 94. The confines of the square array of rods 84, 86, 88 and 90 define in combination with cup support platform 92 a cup receiving elevator 82.

Cup support platform 92 is adapted to receive and support a plurality of cups 30 in nested, stacked relation (see e.g., FIGS. 1 and 3). A portion of indexing mechanism 26, which will be described in further detail hereinafter, is initially actuated to position a platform 92 at the top of rods 84, 86, 88 and 90 of one of the elevator constructions 82, adjacent a cam rail 94 supported on frame 42 and interposed between disc 38 and the top of the elevator constructions 82. Cam rail 94 has a rail portion 96 which is inclined at an angle downwardly and away from disc 38. Cam rail portion 96 is disposed adjacent the rotational path of travel of pins 46, 48 on each small disc 44.

As each cup 30 seated between pins 46, 48 on each small disc 44 approaches the lowermost position of rotation of its disc 44 on the circumference of disc 38 and as the disc 38 continues to change direction, the rim 32 on the cup will make contact with the inclined rail portion 96 of cam rail 94, which will guide the cup 30 down and away from its supporting pins 46, 48 onto support platform 92.

Cup 30 is received on platform 92 with its axis of revolution substantially vertical. Subsequent cups 30 are dropped into nested relation in the preceding cup 30 until a predetermined number of cups have been stacked on platform 92.

For each cup 30 stacked on platform 92, platform 92 is lowered as will be described hereinafter, an increment sufficient to provide sufficient room between cam rail 94 and the top of the stacked cups 30 to receive the succeeding cup.

When a predetermined number of cups 30 are nested and stacked on platform 92 a portion of indexing mechanism 26 is activated to rotate turntable 80 90° to position another elevator to receive a subsequent predetermined number of cups 30.

INDEXING MECHANISMS

As previously described, two indexing mechanisms 26 and 27 are provided. Indexing mechanism 27 causes each support platform 92 to be properly positioned to receive each cup 30 as it is stripped from disc 38. After a predetermined number of cups 30 are stacked on any one platform 92, indexing mechanism 26 will cause turntable 80 to rotate 90°, while simultaneously positioning another platform 92 at the top position in its elevator construction 82.

In order to properly position platform 92 to receive a stack of cups 30, a lift plate 98 is slidably mounted on a standard 100 extending upwardly from the center of turntable 80. Standard 100 is generally rectangular in cross-section, but is provided with T-shaped groove 102 in cross-section along a surface 104. Lift plate 98 includes a central portion 104 having a forwardly extending lip 106 and a rearwardly extending tail 108 complementally shaped and slidably received within groove 102. The lip 106 of lift plate 98 is positioned beneath a support platform 92 to support it during its movement.

Connected at one of its ends to central portion 104 of lift plate 98 is a rope or cable 110. Rope 110 has weight 112 attached to its opposite end. Rope 110 is threaded between an idler bearing 114 and a one-way thrust bearing 116. Bearing 114 is rotatably mounted on a shaft 118 while bearing 116 is fixed to a shaft 120. Shaft 120 connected to one-way thrust bearing 116 is rotatably supported by an L-shaped bracket 122 on shelf 124 of frame 42. Shaft 118 of idler bearing 114 is mounted between ears 125, 126 of a U-shaped bracket 128. The web 130 of U-shaped bracket 128 is connected to a piston rod 132 of a fluid motor 134 mounted on flange 136 of L-shaped bracket 122. The piston rod 132 extends through a bore 138 in flange 136.

Connected to shaft 120 of bearing 116 on the opposite side of bracket 122 through the intermediary of a bearing construction 200 is a crank arm 140. Bearing construction 200 includes an outer bearing 202 fixed to crank arm 140 and an inner bearing 203 fixed to shaft 120. Connected to inner bearing 203 is a ratchet 204 having teeth in abutment with ball bearings 206, which also abut the inner race of bearing 202. A fluid motor 142 has a piston rod 144 connected to spindle 146 on crank arm 140. Fluid motor 142 has an adjustable stroke and is of the type which has an automatic spring return. As shown in FIGS. 8 and 9, motor 142 is disposed in a plane perpendicular to spindle 146.

A microswitch 148 is positioned adjacent the lowermost portion of disc 38 to sense the presence of each cup 30 as it passes this location. As microswitch 148 senses each cup 30, it activates a valve (not shown) to admit fluid from a source to fluid motor 142.

Actuation of fluid motor 142 causes retraction of its piston rod 144 and movement of crank arm 140 through spindle 146 in a clockwise direction as viewed in FIG. 9. Rotational movement of crank arm 140 is transmitted to shaft 120 through outer bearing 202, ball bearings 206, ratchet 204 and inner bearing 203 to cause bearing 116 to be rotated an increment in a counterclockwise direction as viewed in FIG. 3 to feed rope 110 to the left against the bias of weight 112. Feeding the rope 110 against the bias of weight 112 lowers lift plate 98 and support platform 92 an increment just sufficient to receive in nested, stacked relation, the cup 30 which activated movement of the mechanism.

Since the stroke of fluid motor 142 is adjustable, movement of crank arm 140 as well is adjustable, which adjustment can be used to vary the increment of movement of thrust-bearing 116, rope 110 and the amount of drop of lift plate 98 and support platform 92, enabling stacking of cups 30 of different vertical dimensions or lengths. After retraction of piston rod 144 of fluid motor 142, the spring return provided in the motor returns the rod to its initial position, along with crank arm 140. However, because of one-way ratchet 204, frictional engagement of outer bearing 202 with ball bearings 206 will fail to impart movement to inner bearing 203 and shaft 120 in the counterclockwise direction as viewed in FIG. 9. Because of the one-way rotation characteristics only of shaft 120 and thus bearing 116, return of piston rod 144 does not return rope 110 to its initial position, but it remains where it has been moved, as does support platform 92.

When a predetermined number of cups 30 are stacked on a platform 92, e.g., 100, lift plate 98 will be dropped to a position in elevator 82 adjacent turntable 80 where it will strike and activate a microswitch 154 (see FIG. 10). Upon actuation of microswitch 154, fluid from a source (not shown) is admitted to a fluid motor 156 which has its piston rod 158 connected directly to a crank arm 160.

Crank arm 160 is connected to shaft 164 of a one-way bearing construction 166 identical to bearing construction 200. Shaft 164 is fixed by a key 167 or other equivalent means to turntable 80. The throw of crank arm 160 is sufficiently large so as to enable the turntable 80 to be rotated by shaft 164 through 90° everytime microswitch 154 is activated.

As turntable 80 rotates, it rotates relative to standard 100 and lift plate 92. Standard 100 is rotatably mounted, as shown in FIG. 10, on one end of shaft 164. The other end of shaft 164 is rotatably mounted on frame 42.

During rotation of turntable 80, lip 106 will slide beneath the lower surface of the next support platform 92 raised it slightly above the turntable 80. After a suitable delay necessary to position lip 106 just beneath the next platform 92, fluid motor 134 is activated to retract and raise through its piston rod 132, U-shaped bracket 128 and idler bearing 114 against the bias of a coiled, return spring 133 surrounding piston rod 132.

Raising of bearing 114 allows weight 112 to drop as all restraint against movement of weight 112 is removed. When weight 112 drops, it will raise lift plate 98 through rope 110. As lift plate 98 is raised, lip 106 will position the next support platform 92 at the top of its elevator construction 82 as turntable 80 is rotated. The resultant movement locates the next support platform 92 in a position to start receiving the next stack of cups 30 from cam rail 94 and disc 38.

The length of rope 110 is selected so that when weight 112 is on a support surface so it no longer can drop, platform 92 is at the top of its elevator construction 82. When this occurs, idler bearing 114 is automatically returned by spring 133 to clamp rope 110 between it and one-way thrust bearing 116, so rope 110 can be fed backwards to drop the platform 92, as previously described.

OPERATION

To summarize the operation of apparatus 20, cups 30 are disposed in random orientation in hopper 36. They are agitated by an airjet from hose 72 within the hopper 36 and pushed towards disc 38. Parallel pins 46, 48 on smaller discs 44 arranged about the circumference of disc 38 lift a cup 30 from hopper 36 with the rim 32 of cup 30 seated between the pins.

The pins 46, 48 are always maintained in a horizontal plane perpendicular to the axis of revolution of frusto-conical housing 34 of each cup 30 by a counterweight 58 secured to the rear of its disc 44. This retains the cup 30 in a vertical orientation at all times.

If the cup 30 is canted between the pins, flexible wiper blade 76 will knock the cup 30 back into the hopper 36.

Cups 30 are transported by disc 38 and dropped onto a cam rail 94. They slide down cam rail portion 96 onto a support platform 92.

As each cup 30 slides down cam rail portion 96, it activates a microswitch 148, which in turn activates fluid motor 142 to rotate one-way bearing 116 to feed rope 110 against the bias of weight 112 to lower lift plate 98 which supports platform 92 and consequently, to lower the platform 92 in defined increments equal to the vertical dimension of cup 30. The stroke of fluid motor 142 is adjustable, to enable different sizes of cups to be stacked. As platform 92 descends, cups 30 are stacked in nested relation on the platform.

After a predetermined number of cups are stacked, lift plate 98 strikes a microswitch 154 adjacent rotatable turntable 80. Actuation of the microswitch causes fluid motors 156 and 134 to be activated to rotate turntable 80 90° through a one-way bearing construction 166, and to raise idler bearing 144, respectively. As turntable 80 rotates, lip 106 on lift plate 98 is positioned beneath the next support platform 92 and weight 112, having no restraint falls, raising the lift plate 92 and next support platform into cup receiving position.

What is claimed is:

1. Apparatus for orienting and stacking in nested relation cup-like articles having a hollow, truncated conical body portion and an annular rim, said apparatus comprising, in combination,
  hopper means for receiving a plurality of said articles in random orientation,
  rotating disc means cooperating with said hopper means for transferring said articles from said hopper means, said disc means including
  means for grasping said articles beneath said annular rim and orienting said articles with the axis of revolution of their conical body portions in substantially vertical position, and
  stacking means for receiving said articles from said rotating disc means with their truncated conical body portions in nested relationship.

2. Apparatus in accordance with claim 1 further including,
  means for indexing said stacking means after a predetermined number of articles are received thereon in nested relationship.

3. Apparatus in accordance with claim 1 wherein said hopper means includes,
  means for agitating the randomly oriented articles received therein.

4. Apparatus in accordance with claim 1 further including,
  means cooperating with said rotating disc means for sensing articles being transferred by said disc means whose axis of revolution of their conical body portions are not in substantially vertical position and returning such articles to said hopper means.

5. Apparatus in accordance with claim 1 wherein said rotating disc means includes,
  a large circular disc,
  means for rotating said large disc in a substantially vertical plane,
  a plurality of individually rotatable smaller discs arranged in spaced relation about the circumference of said large circular disc, each of said smaller discs having
  parallel pin means extending therefrom in a plane substantially perpendicular to the plane of rotation of said large circular disc into said hopper means for grasping one of said articles beneath its annular rim, and
  means connected to each of said smaller discs for maintaining the parallel pin means extending from each of said discs in a substantially horizontal plane as said large circular disc is rotated to effect transfer of said articles.

6. Apparatus in accordance with claim 3 wherein said agitating means includes,
  means for directing a stream of air to impinge on said randomly oriented articles in said hopper means.

7. Apparatus in accordance with claim 4 wherein said sensing means includes,
  a flexible wiper blade held stationary adjacent said rotating disc means for wiping contact with an article whose axis of revolution of its conical body portion is not in substantially vertical position.

8. Apparatus in accordance with claim 1 wherein said stacking means includes,
  at least one article-supporting platform mounted for movement in a substantially vertical direction, and
  means between said rotatable disc means and article-supporting platform for guiding oriented articles from said disc means to said platform in nested relationship with the axis of revolution of their conical body portions in substantially vertical position.

9. Apparatus in accordance with claim 8 further including,
  a rotatable turntable,
  a plurality of article-supporting platforms slidably mounted on said turntable for movement in a substantially vertical direction, and
  means responsive to sensing a predetermined number of articles supported on any one of said article-supporting platforms for indexing said rotatable turntable to present an empty article-supporting platform in registration with said guide means.

10. Apparatus in accordance with claim 9 wherein said indexing means includes,
  a lift plate adapted to be positioned sequentially beneath one of said article-supporting platforms,
  weight means connected to said lift plate for raising said lift plate and support platform when unrestrained,
  means for restraining said weight means,
  unidirectional bearing means connected to said turntable, and
  fluid motor means operational in response to a predetermined number of articles on an article-supporting platform for removing the restraint of said restraining means on said weight means and for causing rotation of said bearing means, whereby said turntable can be rotated and said lift plate raised to position an empty article-supporting platform in registration with said guide means.

11. Apparatus in accordance with claim 10 wherein said restraining means includes,
  a second unidirectional bearing assembly;
  said weight means includes,
  a weight,
  a rope clamped by said second unidirectional bearing assembly connecting said weight to said lift plate, and
  fluid motor means responsive to the passing of each article from said rotatable disc means to an article-supporting platform to cause rotation of said second unidirectional bearing means to feed said rope against the bias of the weight to lower said lift plate and article-supporting platform in controlled increments.

12. Apparatus in accordance with claim 8 wherein said guide means includes,
  an inclined cam rail disposed in the path of rotation of said articles being transferred by said disc means.

13. Apparatus in accordance with claim 5 wherein said maintaining means includes,
  a counterweight connected to each of said smaller discs.

14. Apparatus in accordance with claim 11 wherein said rotating disc means includes,
  a large circular disc,
  means for rotating said large disc in a substantially vertical plane,
  a plurality of individually rotatable smaller discs arranged in spaced relation about the circumference of said large circular disc, each of said smaller discs having
  parallel pin means extending therefrom in a plane substantially perpendicular to the plane of rotation of said large circular disc into said hopper means for grasping one of said articles beneath its annular rim, and means connected to each of said smaller discs for maintaining the parallel pin means extending from each of said discs in a substantially horizontal plane as said large circular disc is rotated to effect transfer of said articles.

15. Apparatus in accordance with claim 14 wherein said maintaining means includes, a counterweight connected to each of said smaller discs.

16. Apparatus in accordance with claim 15 wherein said hopper means includes, means for agitating the randomly oriented articles received therein.

17. Apparatus in accordance with claim 16 wherein said agitating means includes, means for directing a stream of air to impinge on said randomly oriented articles in said hopper means.

18. Apparatus in accordance with claim 17 further including, means cooperating with said rotating disc means for sensing articles being transferred by said disc means whose axis of revolution of their conical body portions are not in substantially vertical position and returning such articles to said hopper means.

19. Apparatus in accordance with claim 18 wherein said sensing means includes, a flexible wiper blade held stationary adjacent said rotating disc means for wiping contact with an article whose axis of revolution of its conical body portion is not in a substantially vertical position.

* * * * *